United States Patent [19]
More

[11] 3,866,850
[45] Feb. 18, 1975

[54] STRIP CHART HOLDING DEVICE

[75] Inventor: George H. More, Houston, Tex.

[73] Assignee: Bausch & Lomb Incorporated, Rochester, N.Y.

[22] Filed: June 26, 1972

[21] Appl. No.: 266,169

[52] U.S. Cl. .............................................. 242/68.4
[51] Int. Cl. ............................................. B65b 19/02
[58] Field of Search ........... 242/68.4, 68, 68.3, 71.9

[56] References Cited
UNITED STATES PATENTS

| 398,042 | 2/1889 | Harrison | 242/68 |
| 403,814 | 5/1889 | Wilson | 242/68.4 |
| 859,391 | 7/1907 | Lemenager | 242/71.9 |
| 1,342,909 | 6/1920 | Hope | 242/68.4 |

Primary Examiner—John W. Huckert
Assistant Examiner—Edward J. McCarthy
Attorney, Agent, or Firm—Frank C. Parker; Bernard D. Bogdon

[57] ABSTRACT

A substantially square shaped holding device is provided for engaging conventional strip chart rolls at each end to extend outwardly beyond the periphery of a full roll of strip chart to facilitate handling and to prevent the paper on the roll from misaligning with the core of the roll and to maintain a uniform parallel outward play of strip chart when the strip chart and respective holding devices are mounted respectively to, for example, a recorder mount.

6 Claims, 2 Drawing Figures

PATENTED FEB 18 1975 3,866,850

STRIP CHART HOLDING DEVICE

BACKGROUND OF THE INVENTION

1. Field of the Invention

This invention relates to holders for rolls of strip chart and particularly for separate end devices for holding strip charts both during handling and when engaged with a suitable recorder.

2. Description of the Prior Art

Traditionally, strip chart recorders use a chart paper wound on a core resulting in a total overall cylindrical configuration. A typical recorder contains two mandrels which fit into respective ends of chart paper cores. Some recorders have a mandrel in conjunction with a flange which provides an edge guide to help the orderly exit of paper from the chart roll as it is turned. The flange guide frequently is designed to operate in cooperation with sprockets engaging compatibly perforated strip chart paper to give orderly outward flow of the chart paper.

Conventionally, strip chart rolls, when out of the recorder, are troublesome to handle since their cylindrical configuration may allow movement of the chart roll when the chart roll is placed on a non-level surface. Further, an inadvertent movement of the conventional chart roll may cause it to move and roll.

Typical strip chart rolls are wound on a core which is substantially even with the ends of the chart paper and, consequently, the core does little to protect the chart paper from any damage which may be caused at its edges. Likewise, cores of that type do nothing to prevent the chart paper from moving from end alignment with the core. During handling, it is not unusual to cause a roll chart to skew along the longitudinal axis in either one or both of the longitudinal directions. Rolls having this uneven end condition are extremely difficult to use and frequently this described condition cannot be corrected without damage to the paper. Further, the uneven end alignment may cause the paper to jam in the machine causing down time for repair of the situation.

As previously mentioned, typical roll strip chart paper very often rolls or moves when placed on flat surfaces such as worktables or desks either before or after its prescribed operation in the recorder. The circular end configuration of these typically cylindrically shaped chart paper rolls makes stacking difficult. Consequently, one has to be generally satisfied with pyramidal shaped stacks. Otherwise retainers have to be provided which need be of suitable construction and configuration. These retainers would then have to be put in desirable locations in order for them to be convenient for use. Additionally, cylindrical strip chart rolls have traditionally required individual boxing for their protection during shipping and storage to preclude injury which may render them unusable.

SUMMARY OF THE INVENTION

The herein described and claimed invention provides a strip chart holding device which overcomes the handling difficulties caused by conventional strip charts and the frequent adverse conditions which exist when strip chart is exited from the roll. Further, this invention also provides a strip chart which overcomes the various reasons that cause conventional strip chart paper ends to be uneven to the core of the strip chart.

These advantages can be experienced by engaging at least one member of the typical strip chart with an embodiment according to the principles of this invention. A holding device which, most practically, has a peripheral outline in the form of a square is engaged to either end, or preferably both ends, of a strip chart and is of a suitable dimension to extend beyond the circular outline of the full roll of strip chart paper. This invention provides for a device which is substantially flat on the side toward the end of the strip chart. The device fully engages the strip chart core to position the substantially flat surface in direct contact with the end of the strip chart roll. A generally centrally disposed hub on the side opposite the substantially flat surface is provided for engaging a free wheeling mandrel or drive device of a recorder. Use of the invention is most practical when a pair of the inventive devices are positioned one each at opposite ends of the strip chart roll.

This invention thereby provides for stable stacking of strip charts on flat surfaces or in multiple packaging. It additionally provides parallel protection when strip charts are exchanged between different recording devices. In the illustrated preferred embodiments it will be seen that strip chart rolls can additionally be stacked on end in a very stable attitude. These devices or end caps are easily insertable into a recorder chart and likewise into a recorder mount. These types of inventive end caps can be used in sprocket type paper or in non-sprocket type for they enable the paper to exit the roll precisely and can be the reason for elimination for sprocketed paper. Further, the expense of strip chart paper may be significantly reduced.

DESCRIPTION OF THE PREFERRED EMBODIMENT

Figure 1:
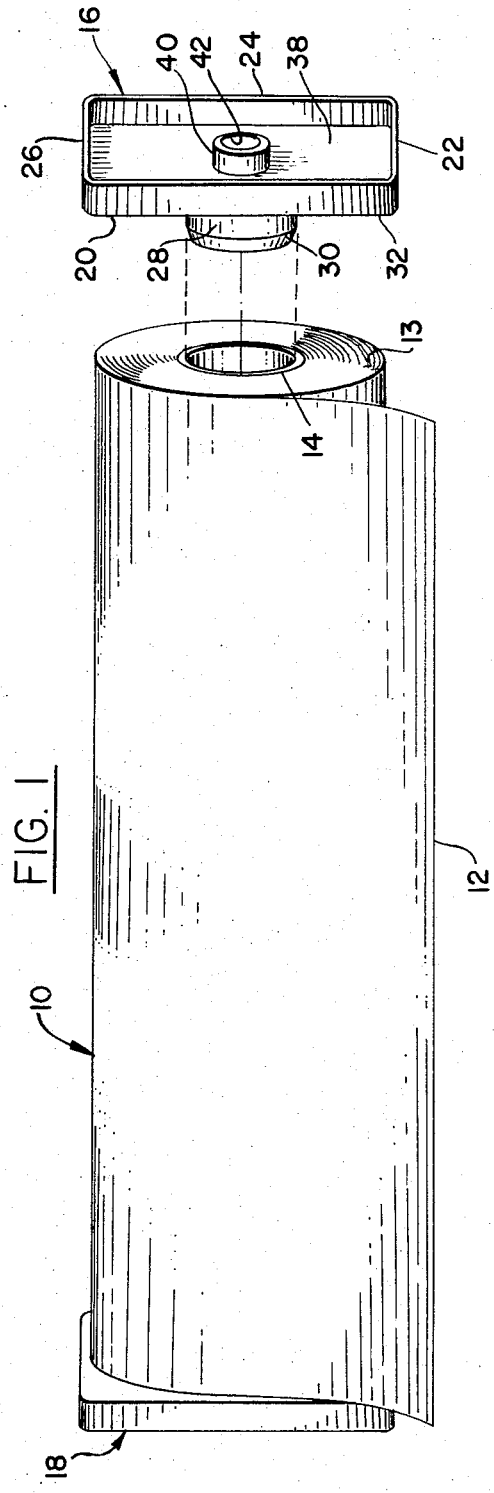
FIG. 1 is an exploded perspective view of a strip chart paper roll engaging holding devices according to the principles of the present invention.

For carrying a strip chart roll 10, including chart paper 12 circularly wound upon cylindrically core shape 14, there is provided as illustrated in FIG. 1 like holding devices or end caps 16 and 18. The chart paper 12 may be of any quantity and may include any printed format thereon and further may include holes (not shown) along either or both edges for engaging the sprockets of any typical recording machine. The cylindrical core 14 is typically formed of cardboard, or of a suitable synthetic material, and is of such a length that it spans the length of the chart paper 12. The inventive holding devices 16 and 18 may be formed of any suitable material such as any of the less expensive plastics, including, for instance, those commonly referred to as styrene, polyethylene or polypropylene. For example, end cap 16 is desirably formed of uniform wall thickness and has an outline configuration which approximates that of a square. The square configuration is formed by substantially flat areas 20, 22, 24 and 26 which are radiused at their respective cores to blend with each other to substantially form a right angle. The width of each of the flat areas 20, 22, 24 and 26 is generally of an arbitrary dimension but is suitably selected in order to provide a stable flat area to facilitate handling of the chart roll 10 when engaged to the end caps 16 and 18. The size of the square end caps 16, 18 from, for example, flat area 20 to flat area 24 is of a dimension which is at least equal to, or greater than, the outside diameter of a full roll of strip chart 10. For engagement of end cap 16 to the core 14 of the strip chart 10 a circular boss 28 is provided. The circular boss 28 is centrally disposed on the square configuration of end cap 16 and has a chamfer 30 to facilitate engagement of the end cap 16, and particularly the circular boss 28, with the core 14 of the strip chart 10. The circular boss 28 has a diameter which is approximately equal to the inside diameter of the core 14.

The end cap 16 is substantially flat on the surface 32 which extends between flat areas 20, 22, 24 and 26 and the base of the circular boss 28. During the engagement of the end cap 16 with the strip chart 10 the circular boss 28 is inserted to its fullest extent into the opening of the core 14 to bring flat surface 32 into tight engagement with the edge 13 of chart paper 12 wound about the core 14. This close relationship prevents the chart paper 12 from skewing when wound about the core 14 and thereby maintains perfect alignment between the edge 13 of the chart paper 12 and the end of the core 14.

Figure 2:
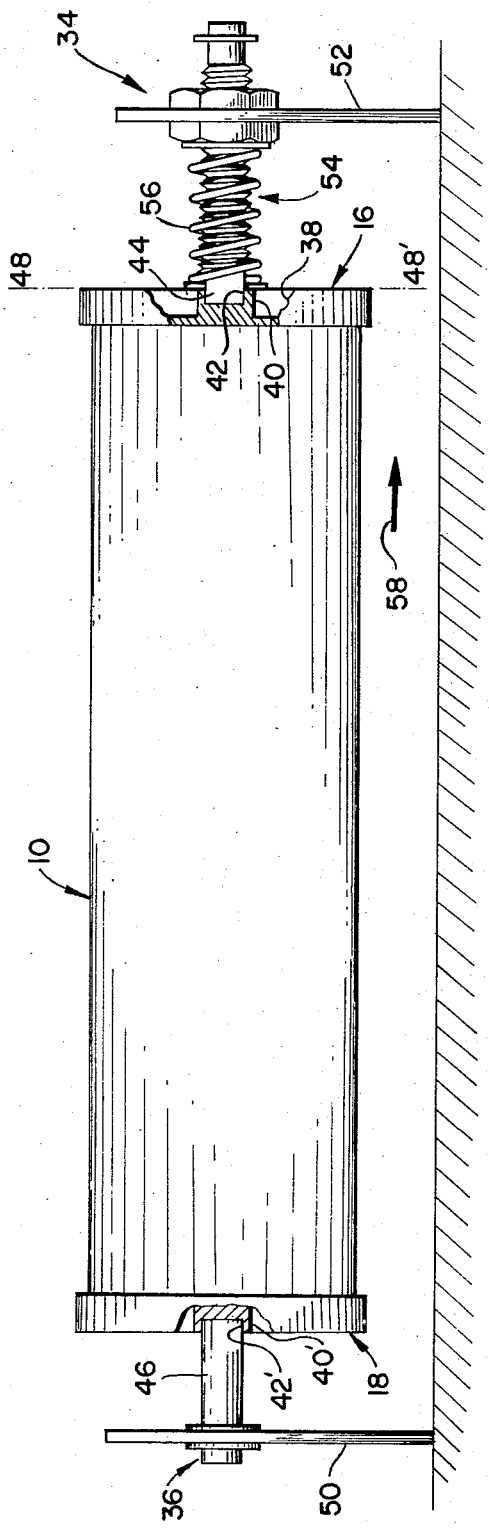
FIG. 2 illustrates the embodiments of FIG. 1 engaged with typical recorder mounts and typically disposed strip recorder chart paper roll in operational position.

For engagement with a recorder mount including supports 34 and 36, as illustrated in FIG. 2, there is provided in a recessed area 38 on end cap 16 of the side opposite circular boss 28 a hub 40 having a circular opening 42 for engaging a recorder mandrel 44 or 46, as best seen in FIG. 2. FIG. 2 also best illustrates the fact that the hub 40 does not extend outside of the recessed area 38. The advantages of the flat surfaces 20, 22, 24 and 26 and the substantially flat plane 48-48' are vividly evident, since these flattened portions enable the strip chart 10 to engage with end caps 16 and 18 to be placed upon any substantially planar surface without rolling from its original location due to an evenness of the planar surface. In addition, the cores can be stacked upright with the planar surface 48-48' placed square against any other selected table surface.

In FIG. 2 support 36 comprises a recorder upright member 50 fixedly secured to the mandrel 46 at the opposite end of the strip chart 10. Support 34 comprises a recorder upright member 52 readily engaging an adjustment assembly 54 for compensating for different length strip chart rolls. It is obvious that adjustment assembly 54 can be moved inwardly and outwardly from recorder upright member 52 to control the outward dimension and extension of mandrel 44.

When the strip chart 10 is loaded into the recorder supports 34 and 36 it typically involves engaging mandrel 44 into hole 42 of hub 40 and exerting pressure against the spring 56 about the adjustment assembly 54. Then by moving the strip chart 10 in the direction of arrow 58 the end cap 18 may be engaged at hole 42' of the hub 40' with mandrel 46.

When the assembly of strip chart 10 and end caps 16 and 18 are engaged as illustrated in FIG. 2 it will be appreciated that the mandrels 44 and 46 may be constructed so that they remain stationary while the end caps revolve. However, a preferred embodiment would include each of the mandrels 44 and 46 to be tightly engaged with the respective hubs 40 and 40' and for mandrels 44 and 46 to be rotatably secured at recorder upright members 50 and 52 at ball and race assemblies.

From this disclosure it should be clearly evident that embodiments according to the principles of this invention are extremely useful in handling chart paper rolls to prevent misalignment of the edges of the chart paper in relation to the cores upon which they are wound. Consequently, skewing of the chart paper is eliminated. End caps which are constructed like 16 and 18 facilitate handling of strip charts during packaging and unpackaging and at all points of handling for it is obvious that any individual chart can conveniently be set down on a flat surface either lengthwise or upright. They can be thereby expected to remain in a set position and not roll away as would a conventional chart paper without end caps according to the principles of the present invention. Further, when in operation a recorder chart paper is exited from its core in a parallel fashion due to the close relationship of the end caps to the edges of the paper. Under most conditions embodiments according to the principles of the present invention can eliminate the need for chart paper having perforations to accept sprocket teeth and make available a much more reliable and less expensive product than was previously obtainable.

I claim:

1. A roll strip chart holder for engaging a generally cylindrically shaped roll of strip chart for use with a recorder, comprising:
a body member having a substantially flat surface for positioning at one end of the roll of strip chart to bear against the edges of chart paper carried upon a roll core for strip chart paper, the body member having a generally centrally disposed hub for rotatably engaging a mount associated with a recorder, the body member having at least two portions which protrude outwardly from the centrally disposed hub to integrally form a substantially flat landing extending beyond the periphery of the roll of strip chart to provide edge alignment of the strip chart with the roll core and support for the roll of strip chart during handling.

2. The chart holder as defined in claim 1 wherein the at least two portions extending outwardly from the centrally disposed hub form a substantially rectangular outline having four substantially flat lands.

3. The chart holder as defined in claim 2 wherein the peripheral form of the member having at least two portions extending outwardly from the centrally disposed hub is substantially square.

4. A strip chart holder for engaging a generally cylindrically shaped roll of strip chart paper for use with a recorder, comprising:
an end cap for engaging the end of a roll of strip chart paper carried on a core, said end cap having a wall multi-sided in shape and extending in a plane perpendicular to a central axis of the cylindrically shaped roll of chart paper wherein at least one of the sides of the wall is dimensioned from the central axis to extend beyond the diameter of the roll of strip chart paper, the end cap further defining a substantially flat surface for abutment with the end of the roll of strip chart paper when engaged therewith;
first means centrally located on said flat surface for engaging the core of the strip chart paper; and
second means coaxially aligned with said first means for receiving a member of a recorder to support one end of said strip chart paper when said first means is engaged with said core.

5. The device according to claim 4, wherein the first means is a boss which extends perpendicularly from said flat surface to engage the core of a roll of strip chart paper.

6. The device according to claim 5 wherein the second means is a hub which extends in a direction opposite to said boss to receive a member of a recorder to support one end of said strip chart paper.

* * * * *